United States Patent
Suzuki et al.

[15] 3,666,774
[45] May 30, 1972

[54] CERTAIN THIENYL ALIPHATIC HYDROCARBON AMIDES

[72] Inventors: Yoshio Suzuki, Amagasaki-shi; Shunji Aono, Toyonaka-shi; Hideaki Fukushima, Nishinomiya-shi, all of Japan

[73] Assignee: Sumitomo Chemical Company, Ltd., Higashi-ku, Osaka, Japan

[22] Filed: Aug. 29, 1969

[21] Appl. No.: 854,308

[30] Foreign Application Priority Data

Sept. 7, 1968 Japan..................................43/64394

[52] U.S. Cl...........260/332.2 A, 260/295 AM, 260/295.5 A, 260/347.3, 424/266, 424/275, 424/285, 99/19, 99/99, 99/113, 99/117, 99/118 R, 99/119
[51] Int. Cl. .......................................C07d 63/10
[58] Field of Search...........260/332.2 R, 295 AM, 295.5 AM

[56] References Cited

UNITED STATES PATENTS 3,555,035  1/1971  Meisels et al. ..........................260/295

OTHER PUBLICATIONS

Roberts et al., Basic Principles of Organic Chemistry Benjamin Inc., page 531 (1965).

Primary Examiner—Alan L. Rotman
Attorney—Stevens, Davis, Miller & Mosher

[57] ABSTRACT

A novel fatty acid amide useful as an anti-arteriosclerotic agent which is represented by the formula,

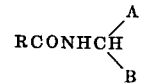

wherein R represents a saturated or unsaturated straight or branched aliphatic hydrocarbon group having 15 to 25 carbon atoms which may bear a hydroxyl group, A represents a lower alkyl group, aryl group or aralkyl group and B represents a hetero-cyclic radical containing a nitrogen, oxygen or sulfur atom, such as, for example, α-(thienyl or pyridyl)-ethyl or benzyl amide of linoleic acid, isostearic acid, linolenic acid, oleic acid or safflower oil. These compounds are prepared by reacting the appropriate fatty acid or reactive derivative with an amine of the formula,

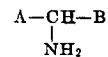

These compounds may be incorporated in foodstuffs or ingested with a suitable carrier.

8 Claims, No Drawings

CERTAIN THIENYL ALIPHATIC HYDROCARBON AMIDES

This invention relates to novel anti-arteriosclerotic agents. More particularly, the invention pertains to novel agents which are useful for the lowering of elevated levels of cholesterol in the blood.

Arteriosclerosis is an adult disease for which there is no known satisfactory cure. Although the cause for arteriosclerosis is not yet known in spite of discussions in the academic circles, it has broadly been recognized that one of the most significant histo-pathological manifestations of arteriosclerosis is the deposition of lipids in the blood. Accordingly, research has been directed to the disturbed metabolism of lipids, and attention has been given to the extraordinarily elevated level of cholesterol in the blood.

A number of experimental and clinical facts have been reported, which indicate the relationship between arteriosclerosis and elevated blood cholesterol level. Hence, the development of agents to reduce the elevated blood cholesterol level is considered extremely important for the prevention of arteriosclerosis.

Concentrated efforts have heretofore been made for the development of such agents for lowering cholesterol, and a number of compounds have been tested clinically, but none of them have been proved to be completely satisfactory. Some of them are fairly effective but produce significantly harmful side effects, and others have inadequate effectiveness, so that they are required to be administered in large doses.

A group of compounds practically employed nowadays for the above purpose comprises unsaturated fatty acids, especially linoleic acid. The reason why linoleic acid is employed is because of its harmlessness to the human body. However, its effectiveness is not very high, and is uncertain and indefinite. Accordingly, large doses are required to obtain at least appreciable efficacy as a cholesterol-lowering agent.

The present inventors have found a group of compounds which are effective as cholesterol-lowering agents and are substantially nontoxic.

It is therefore an object of the present invention to provide cholesterol-lowering agents.

Another object is to provide a process for preparing cholesterol-lowering agents.

A further object is to provide pharmaceutical compositions containing such agents.

Other objects will be apparent from the following description.

In order to accomplish the above objects, the present invention provides fatty acid amides represented by the formula,

(I)

wherein R represents a saturated or unsaturated aliphatic hydrocarbon group having 15 to 25 carbon atoms and which may bear a hydroxyl group, A represents a lower alkyl group, monocyclic aryl group or monocyclic aralkyl group, and B represents a hetero-cyclic radical containing a nitrogen, oxygen or sulfur atom as the hetero atom, and a process for the production of the same.

These fatty acid amides (I) are novel compounds, and are prepared by reacting a fatty acid represented by the formula,

wherein R is as defined above, its reactive derivative or a natural oil containing the fatty acid, with an amine represented by the formula,

wherein A and B are as defined above.

Examples of the fatty acids represented by the general formula (II), the reactive derivatives thereof, and the natural oils which are used in the present invention include the following:

Saturated fatty acids: palmitic acid, stearic acid, isostearic acid, arachic acid, behenic acid, lignoceric acid, pentacosanoic acid, hexacosanoic acid, and the like.

Unsaturated fatty acids: palmit-oleic acid, zoomaric acid, oleic acid, petroselinic acid, elaidic acid, vaccenic acid, gadoleic acid, erucic acid, brassidic acid, selacholeic acid, linoleic acid, linolenic acid, linoelaidic acid, ricinoleic acid, eleosostearic acid, parinaric acid, γ-linolenic acid, eicosatetraenoic acid, eicosahexaenoic acid, arachidonic acid and the like.

Reactive derivatives: an acid halide, acid anhydride, mixed acid anhydride, lower alkyl ester and glyceride, and the like of the foregoing saturated and unsaturated fatty acids.

Natural oils: hempseed oil, linseed oil, perilla oil, oiticica oil, kaya oil, walnut oil, poppyseed oil, safflower oil, watermelon-seed oil, soybean oil, sunflower oil, rice bran oil, pumpkin-seed oil, kaoliang oil, sesame oil, corn oil, maize oil, rape seed oil, cottonseed oil, olive oil, cashew oil, tsubaki oil, ergot oil, caster oil, peanut oil, palm oil, palm kernel oil, coconut oil, beef tallow, lard, bone oil, horse fat, locust oil, chrysalis oil, shark oil, cuttlefish oil, sardine oil, mackerel oil, saury oil, herring oil, saurel oil, cod oil, trout oil, grey mullet oil, tunny oil, menuke oil, menhaden oil, eel oil, flatfish oil, whale oil, liver oil, and residual oil.

The alkyl group of A of the amine derivative (III) used in the present invention is a straight or branched alkyl group having one to four carbon atoms. Examples of the aralkyl of A of the amine derivative (III) include benzyl group, phenylethyl group, phenylpropyl group, and phenylbutyl group. Preferred examples of the hetero-cyclic compound radical of B of the amine derivative (III) contain four to five carbon atoms and include pyrrolyl group, pyrrolinyl group, pyrrolidinyl group, pyridyl group, piperidyl group, morpholinyl group, furyl group, hydrofuryl group, pyrryl group, hydro-pyrryl group, thienyl group, hydrothienyl group, and the like.

Amine derivatives used in the present invention can be produced according to methods disclosed in, for example, J. Amer. Chem. Soc., 64, 477 (1942), ibid, 50, 2484 (1928), J. Org. Chem., 23, 989 (1959) or ibid, 24, 1936 (1959).

In accordance with the present invention, the desired fatty acid amides can be obtained with advantages by the following reaction procedures:

1. reaction of a fatty acid with an amine in the presence or absence of a dehydrating agent to remove water,
2. reaction of a fatty acid ester or glyceride with an amine in the presence or absence of a catalyst to remove alcohol,
3. reaction of a fatty acid halide with an amine, or
4. reaction of an acid anhydride or a mixed acid anhydride with an amine.

The above-mentioned reaction procedures will be successively explained in further detail below.

1. Reaction of the fatty acid with the amine:

In this reaction, the two compounds are used in equimolar amounts, or either one of them is used in excess. In the case of the absence of dehydrating agent, a solvent such as toluene or xylene may be used, if necessary. Ordinarily, the reaction is carried out at 100°–300° C in the absence of solvent, while removing or not removing eliminated water. The reaction is usually completed in several hours to several days. The starting material used in excess is recovered and is reused in the reaction, whereby the desired fatty acid amide can be synthesized economically. Further in the case of the presence of a dehydrating agent, the two compounds are used in equimolar amounts or either one of them is used in excess, and the two are dissolved in a suitable solvent, e.g. benzene, toluene, xylene, carbon tetrachloride, or the like. To this solution is added a dehydrating agent selected from the group consisting of sulfuric acid, potassium hydrogen sulfate, phenosulfonic acid, p-toluenesulfonic acid, p-toluenesulfonyl chloride, and acidic and basic ion exchange resins, e.g., Amberlite IRA-400, IR-50, and IR-120, and Amberlyst 15, 21, 26, and 27 (all these are trade names of ion exchange resins produced by Rohm & Haas Co.). Subsequently, the mixture is refluxed for 10 to 200 hours while removing water formed during the reaction using a water-separator, if necessary. Thereafter, the dehydrating agent is removed, and then the solvent and unreacted materials are recovered, whereby a desired fatty acid amide can be obtained economically. When a di-substituted carbodiimide is used as a dehydrating agent, the reaction can be terminated in a short period of time at a low temperature. Examples of such di-substituted carbodiimides include diphenylcarbodiimide, diisopropylcarbodiimide, dicyclohexylcarbodiimide and the like. Of these, however, dicyclohexylcarbodiimide is most frequently employed. In this case, said fatty acid, said amine and the di-substituted carbodi-imide are dissolved in separate inert solvents respectively, for example, ether, dioxane, tetrahydrofuran, petroleum ether, ligroin, kerosene, n-hexane, cyclohexane, benzene, toluene, xylene, dichloromethane, dichloroethane, chloroform or carbon tetrachloride, and then the three solutions are mixed together with vigorous stirring at room temperature or below, whereby the reaction is substantially complete in several minutes. Ordinarily, however, the mixture is allowed to stand at room temperature for several hours and then the formed di-substituted urea is separated by filtration. The desired amide can be easily obtained in a high yield. The separated di-substituted urea is again converted to the di-substituted carbodiimide and is re-usable.

2. Reaction of a lower alkyl ester of the fatty acid, or a glyceride containing said fatty acid, with the amine: (the lower alkyl ester referred to in the above is an ester containing an alkyl group having one to five carbon atoms):

The two compounds are used in equimolar amounts or either one of them is used in excess. A mixture of them is heated at 100°–250° C while removing the eliminated alcohol as much as possible, whereby the reaction is terminated in a period of about 50 hours to several days. If necessary, a solvent such as toluene or xylene may be used in the above reaction, but no solvent is necessary in most cases. The reaction time can be shortened by using a catalytic amount of an alkaline condensing agent such as lithium, sodium or potassium metal, sodium methylate, sodium ethylate, caustic soda, caustic potash, sodium carbonate or potassium carbonate, or an acidic condensing agent such as sodium hydrogen sulfate or boric acid as a catalyst.

3. Reaction of a fatty acid halide with the amine:

This reaction is carried out in the following manner:

The amine is dispersed in water or in an aqueous mixed solvent comprising water and acetone, dioxane or tetrahydrofuran. To the resulting dispersion, the fatty acid halide is gradually added at 0°–30° C in the presence of an alkali such as caustic soda, caustic potash, sodium carbonate, potassium carbonate or sodium hydrogen carbonate, whereby a desired amide of the present invention can be obtained. Alternatively, the amine is dissolved in an inert organic solvent such as acetone, methylethylketone, methylisobutylketone, ether, dioxane, tetrahydrofuran, petroleum ether, ligroin, kerosene, benzene, toluene, xylene, chloroform or carbon tetrachloride, in the presence of a basic substance such as sodium carbonate, potassium carbonate, caustic soda, caustic potash, or tertiary amine such as trimethylamine, triethylamine, dimethylaniline, diethylaniline, pyridine or lutidine, and the solution is gradually charged with the fatty acid halide at 0°–20° C and, if necessary, the reaction mixture is then heated, whereby the desired amide of the present invention can be obtained in an extremely high yield.

4. Reaction of an anhydride of the fatty acid with the amine:

The acid anhydride employed in this reaction is a compound represented by the formula,

wherein R is as defined previously and $R^2$ is identical with R or is an alkyl or alkoxy group having one to four carbon atoms.

The reaction is carried out in such a manner that a solution of the acid anhydride in an inert solvent is gradually added at 0°–100 C to the amine or to a solution thereof in an inert solvent and, if necessary, the mixture may be heated to complete the reaction. The fatty acid formed in the reaction and unreacted fatty acid anhydride can be recovered to reuse, if necessary. In the case of a mixed acid anhydride of fatty acid and lower alkyl formate which is obtained by reacting a fatty acid of the formula (II) with, for example, ethyl chloroformate, the reaction can be terminated extremely quickly and at a low temperature. Such mixed acid anhydride is frequently used for the synthesis of peptides and can be prepared according to, for example, the method disclosed in the Journal of American Chemical Society, Vol. 74, page 676 (1952).

The solvent in the above reaction may be toluene, xylene, n-hexane, cyclohexane, petroleum ether, ligroin, kerosene, ether, dioxane, tetrahydrofuran, acetone, methylethylketone, methylisobutylketone, chloroform or carbon tetrachloride. The reaction is completed in a period of 20–30 minutes to 2 hours by mixing an organic solvent solution of the mixed acid anhydride with the amine at a temperature within the range of from −20° to 20° C. Ordinarily, however, the mixture is allowed to stand overnight at room temperature to complete the reaction, whereby the desired fatty acid amide of the present invention can be easily obtained.

The fatty acid amides of the present invention have excellent cholesterol-lowering effects, as is clear from the following experimental example showing a comparison in cholesterol-lower action between known cholesterol-lowering agents and some of the compounds of the present invention. However, the compounds of the present invention are not limited to them.

USE EXAMPLE

Compounds of the present invention and known cholesterol-lowering agents were individually incorporated in given amounts into feed stuffs each containing 1 percent of cholesterol and 0.5 percent of bile acid salt. Using the above feedstuffs, mice were reared for 10 days. On the 11th day, the amounts of serum and liver cholesterol were measured. The total amount of the serum and liver cholesterol per 100 g of the body weight of each mouse (cholesterol pool value) was calculated, and the variation (percent) in cholesterol pool value was calculated according to the following equation:

$$\text{Variation (\%)} = \left(1 - \frac{\text{value of treated group}}{\text{value of control group}}\right) \times 100$$

The cholesterol pool variations of the test compounds were as shown in Table 1, and all of the present compounds showed far more prominent cholesterol-lowering effects than in the case of the known compounds, β-sitosterol and linoleic acid, despite the fact that they were used in smaller amounts.

TABLE 1.—CHOLESTEROL POOL VARIATIONS OF TEST COMPOUNDS

| Compounds | Chemical structures | Percent in diet | Variation (percent) |
|---|---|---|---|
| Linoleoyl-α-(2-thienyl)-ethyl amide | $C_{17}H_{31}CONHCH(CH_3)$-(2-thienyl) | 0.2 | −48 |

TABLE 1.—CHOLESTEROL POOL VARIATIONS OF TEST COMPOUNDS – Continued

| Compounds | Chemical structures | Percent in diet | Variation (percent) |
|---|---|---|---|
| Isostearoyl-α-(2-thienyl)-ethyl amide | i-$C_{17}H_{35}$CONHCH(CH$_3$)-(2-thienyl) | 0.2 | −49 |
| Linolenoyl-α-(2-thienyl)-ethyl amide | $C_{17}H_{29}$CONHCH(CH$_3$)-(2-thienyl) | 0.2 | −44 |
| Linoleoyl-α-(2-thienyl)-phenethyl amide | $C_{17}H_{31}$CONHCH(CH$_2$-phenyl)-(2-thienyl) | 0.2 | −77 |
| α-(2-thienyl)phenethyl-amide of safflower oil | Safflower oil—CONHCH(CH$_2$-phenyl)-(2-thienyl) | 0.2 | −73 |
| Linoleoyl-α-(2-pyridyl)-benzyl amide | $C_{17}H_{31}$CONHCH(phenyl)-(2-pyridyl) | 0.2 | −48 |
| Oleoyl-α-(3-pyridyl)-benzyl amide | $C_{17}H_{33}$CONHCH(phenyl)-(3-pyridyl) | 0.2 | −58 |
| Linoleoyl-α-(3-pyridyl)-benzyl amide | $C_{17}H_{33}$CONHCH(phenyl)-(3-pyridyl) | 0.2 | −60 |
| Oleoyl-α-(2-pyridyl)-benzyl amide | $C_{17}H_{33}$CONHCH(phenyl)-(2-pyridyl) | 0.2 | −45 |
| Linoleoyl-α-(4-pyridyl)-benzyl amide | $C_{17}H_{31}$CONHCH(phenyl)-(4-pyridyl) | 0.2 | −56 |
| α-(4-pyridyl)benzyl amide of whale oil | Whale oil—CONHCH(phenyl)-(4-pyridyl) | 0.2 | −47 |
| Known cholesterol-lowering agents | β-Sistosterol | 1.0 | +20 |
|  | Linoleic acid | 1.0 | +10 |
| Control (no addition) |  |  | 0 |

In actual application of the fatty acid amides of the present invention for lowering cholesterol level in the blood, the compounds are orally administered in a dose about 0.1–10 g/day. Ordinarily, pharmaceutically acceptable inert carriers may be used for oral administration of the amides.

Alternatively, the fatty acid amides may be incorporated into foodstuffs to give enriched foodstuffs.

Foods into which the said amides may be incorporated in line with the object of the present invention are as follows: dairy products such as butter, margarine, cheese, cream, ice cream, skim milk, dry milk, and whole milk; animal and vegetable edible oils such as frying oils, salad oils, mayonnaise and lard; cereal and related foods such as vermicelli, bread, crackers, biscuits, wheat flour, starch, rice, rice flour, dough, buckwheat flour, and miso (Japanese bean paste); confectioneries such as caramels, chocolate, chewing gum, wheatglutens, and candies; processed meat and fish such as ham, sausages, and pasty products; and other various foods.

Because of their low toxicity, the aforesaid higher unsaturated fatty acid amides can be admixed with the said foods in an extremely wide range of proportion and should be appropriately used depending on the amount and the frequency of intake of the food to be employed. For example, cream or the like, the intake of which is usually small may contain a higher percentage of the said amides, whereas wheat flour, rice flour or the like, the intake of which is rather large may contain a lower percentage of the said amides. Generally, the range varies from about 0.1 percent to about 80 percent by weight of the enriched foodstuff.

The intake amount of the active ingredient (acid amide) in the foodstuff is preferably about 10 g per day at the maximum.

In admixing or compounding the said amides, there may be added without prejudicially influencing the accomplishment of the present invention other commonly-used additives such as natural or synthetic emulsifying agents for foods (e.g., lecithin, sorbitan, sucrose esters, fatty acid monoglyceridees), antioxidants for foods [e.g. BHT, BHA (butylated hydroxyanysole), tocopherlls, propyl gallate, nordihydroguaiaratic acid], coloring agents, flavors, seasonings, and water.

For example, in applying the present invention to margarine, fats such as beef tallow, lard and a hardened oil (e.g. hardened corn oil) are admixed with oils such as soybean oil, peanut oil, cotton seed oil and safflower oil in a compounding machine so as to prepare a product of suitable melting point and, to the resulting mixture, there is added an appropriate amount of the above-mentioned amides according to need and the object in view, a coloring agent, aqueous sodium chloride solution, an emulsifying agent, an antioxidant and the like. Then, the resultant mixture is vigorously agitated in an emulsifier at a temperature a little higher than the melting point and rapidly chilled in a chilling machine to obtain enriched margarine.

Since the higher fatty acid amides used in the present invention are extremely soluble in fats, the said amides can be admixed with edible oils and the like by simply agitating the mixture in a compounding machine, if necessary, with slight warming.

Addition to powdered foods such as wheat flour and rice flour may be practiced by mixing the foods and the said amides in a mill or compounding machine. If necessary, the amides may be added in the form of a solution in an inert organic solvent such as ethyl alcohol or a vegetable oil.

Enriched bread, enriched wheat vermicelli, enriched crackers, enriched biscuits, enriched instant Chinese vermicelli and the like may be prepared by, per se, conventional procedures using wheat flour, buckwheat flour or the like previously admixed with the said amides.

According to the present invention enriched rice and the like can be prepared by admixing rice and the like coated with the said amides with untreated rice or by mixing the particles made of the said amides, wheat flour, cellulose acetate, gum arabic, rice powder and the like with untreated rice.

Since the higher unsaturated fatty acid amides are tasteless and odorless, the enriched foods disclosed above have the same taste as the original foods; if anything, the amides rather add smooth feeling to the tongue to improve the appetite. Moreover, the said amide derivatives are of high decomposition temperature, do not decompose at the usual frying temperatures and are not hydrolyzed with acids and alkalis thus liberating no free amines.

The present process will be further explained in detail with reference to the following examples, which, however, are not to be considered as limiting.

EXAMPLE 1

To a solution of 2.1 g of triethylamine and 3.8 g of α-(2-pyridyl)benzlamine in 70 ml of ether, 4 g of linoleoyl chloride was added dropwise at 15°–20° C with stirring. The mixture was stirred at room temperature for 2 hours, then allowed to stand for one night, and subsequently refluxed for 2 hours with stirring. After cooling, the reaction mixture was washed with water, an aqueous sodium carbonate solution and then water, and dried over Glauber's salt, and then the solvent was distilled off therefrom. Subsequently, the reaction product was purified by a silica gel column chromatograph with a mixed solvent of benzene and chloroform, and the solvent was completely distilled off to give 7.3 g (yield: 79 percent) of the objective linoleoyl-α-(2-pyridyl)benzylamide, $N_D^{23}$ 1.5330.

Elemental analysis $C_{17}H_{31}CONHCH-$

| | Analytical values | Theoretical values |
|---|---|---|
| C (percent) | 80.57 | 80.67 |
| H (percent) | 9.44 | 9.48 |
| N (percent) | 6.11 | 6.27 |

EXAMPLE 2

In a distilling flask, a mixture of 14 g of oleic acid and 12 g of α-(3-pyridyl)benzylamine was heated with stirring in a nitrogen stream at 160° C for 45 hours while removing the water by-produced from the reaction system. The reaction product was purified by a silica gel column chromatograph with a mixed solvent of benzene and chloroform and the solvent was distilled off completely to give 15.4 g (yield: 71 percent) of the objective oleoyl-α-(3-pyridyl)benzylamide, $N_D^{23}$ 1.5323.

Elemental analysis $C_{17}H_{33}CONHCH-$

| | Analytical values | Theoretical values as |
|---|---|---|
| C (percent) | 80.49 | 80.30 |
| H (percent) | 9.40 | 9.89 |
| N (percent) | 6.10 | 6.24 |

EXAMPLE 3

A mixture of 7 g of isostearic acid, 4 g of α-(2-thienyl)ethylamine, 0.2 g of p-toluenesulfonic acid in 50 ml of xylene was refluxed for 40 hours while removing the water by-produced from the reaction vessel. After the completion of reaction, 50 ml of ether was added thereto and the reaction mixture was washed in a cooled state with dilute hydrochloric acid, water, an aqueous sodium carbonate solution and water, and then dried over Glauber's salt. The solvent was distilled off completely to give 7.2 g (yield: 73 percent) of the objective isostearoyl-α-(2-thienyl)ethylamide, $N_D^{23}$ 1.5099.

Elemental analysis

| | Analytical values | Theoretical values as $i\text{-}C_{17}H_{35}CONHCH\text{-}\underset{CH_3}{\overset{}{\underset{|}{}}}\!\!\!\!\!\!\!\!\!\!\!\!\!\!\underset{}{\overset{}{\bigg\langle}}\!\!\!\underset{S}{\overset{}{\bigg\rangle}}$ |
|---|---|---|
| C (percent) | 73.10 | 73.28 |
| H (percent) | 11.02 | 10.94 |
| N (percent) | 3.38 | 3.56 |
| S (percent) | 8.00 | 8.14 |

EXAMPLE 4

To a solution of 1.3 g of linolenic acid in 30 ml of ether was mixed a solution of 0.8 g of α-(2-thienyl)ethylamine and 1.2 g of dicyclohexyl carbodiimide in 20 ml of ether at 0° C with stirring. The resultant mixture was stirred for one night. Five ml of glacial acetic acid was added thereto and the resultant mixture was allowed to stand for 2 hours and filtered. The filtrate was washed in a cooled state with dilute hydrochloric acid, water, an aqueous sodium carbonate solution and water, and then dried over Glauber's salt. The solvent was distilled off completely to give 1.5 g (yield: 83 percent) of linolenoyl-α-(2-thienyl)ethylamide, $N_D^{24}$ 1.5082.

Elemental analysis

| | Analytical values | Theoretical values as $C_{17}H_{29}CONHCH\text{-}\underset{CH_3}{\overset{}{\underset{|}{}}}\!\!\!\!\!\!\!\!\!\!\!\!\!\!\underset{}{\overset{}{\bigg\langle}}\!\!\!\underset{S}{\overset{}{\bigg\rangle}}$ |
|---|---|---|
| C (percent) | 74.58 | 74.42 |
| H (percent) | 9.77 | 9.56 |
| N (percent) | 3.51 | 3.62 |
| S (percent) | 8.29 | 8.27 |

EXAMPLE 5

A mixture of 15 g of methyl linolate and 15 g of α-(2-thienyl)-phenethylamine was heated at 150° C for 70 hours while removing by-produced methanol from the reaction vessel. After cooling, 100 ml of benzene was added thereto, and the resultant mixture was washed in a cooled state with dilute hydrochloric acid, an aqueous sodium carbonate solution and water, and dried over Glauber's salt. The reaction product was purified by a silica gel column chromatograph and the solvent was distilled off completely to give 19.9 g (yield: 84 percent) of the objective linoleoyl-α-(2-thienyl)-phenethylamide, m.p. 41° to 42° C.

Elemental analysis

| | Analytical values | Theoretical values as $C_{17}H_{31}CONHCH\text{-}\underset{CH_2\text{-}\!\!\!\bigg\langle\bigg\rangle}{\overset{}{\underset{|}{}}}\!\!\!\!\!\!\!\!\underset{}{\overset{}{\bigg\langle}}\!\!\!\underset{S}{\overset{}{\bigg\rangle}}$ |
|---|---|---|
| C (percent) | 77.23 | 77.42 |
| H (percent) | 9.10 | 9.25 |
| N (percent) | 2.93 | 3.01 |
| S (percent) | 6.67 | 6.88 |

EXAMPLE 6

A mixture of 20 g of whale oil and 25 g of α-(4-pyridyl)benzylamine was heated at 150° C for 80 hours. After cooling, 100 ml of ether was added thereto, and the resultant mixture was washed in a cooled state with an aqueous sodium carbonate solution and water, and dried over Glauber's salt. Thereafter the solvent was completely distilled off. Subsequently, the resultant reaction product was purified by a silica gel column chromatograph with a mixed solvent of benzene and chloroform and the solvent was distilled off completely to give 24 g of a material having $N_D^{23}$ 1.5396.

Elementary analysis of the material showed 79.07 percent of carbon, 6.32 percent of hydrogen and 15.02 percent of nitrogen and infrared absorption spectrum showed an absorption of —NH— at 3260 cm$^{-1}$ and an absorption of —CON= at 1650 cm$^{-1}$. These results indicated that the material was the objective

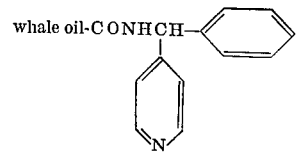

EXAMPLE 7

The temperature of a mixture of 24 g of oleic anhydride and 25 g of α-(2-pyridyl)benzylamine was gradually raised while stirring the mixture and finally the mixture was stirred at 120° C for 4 hours. The resultant reaction mixture was washed in a cooled state with an aqueous sodium carbonate solution and water, and dried over Glauber's salt, and then the solvent was distilled off. Subsequently, the resultant reaction product was purified by a silica gel column chromatograph with a mixed solvent of benzene and chloroform and the solvent was distilled off completely to give 14.8 g (yield: 75 percent) of the objective oleoyl-α-(2-pyridyl)benzylamide $N_D^{24}$ 1.5330.

Elemental analysis

| | Analytical values | Theoretical values as $C_{17}H_{33}CONHCH\text{-}\!\!\bigg\langle\!\!\bigg\rangle$ with pyridyl |
|---|---|---|
| C (percent) | 80.17 | 80.30 |
| H (percent) | 9.96 | 9.89 |
| N (percent) | 6.09 | 6.24 |

EXAMPLE 8

To a solution of 21 g of linoleic acid and 7.7 g of triethylamine in 150 ml of toluene was added dropwise 8.4 g of ethyl chloroformate at —7° C with stirring. After stirring the mixture at said temperature for 30 minutes, a solution of 15.5 g of α-(2-thienyl)phenethylamine in 70 ml of toluene was added dropwise thereto at —5° to —7° C. The stirring was continued at said temperature for 20 minutes and then at room temperature for 2 hours. The resultant reaction mixture was allowed to stand for one night. Subsequently, the resultant reaction mixture was washed in a cooled state with dilute hydrochloric acid, water, an aqueous sodium carbonate solution and water. After drying over Glauber's salt and concentrated, to give 23 g (yield: 66 percent) of crystals of the objective linoleoyl-α-(2-thienyl)phenethylamide, m.p. 41° to 42°C.

Elemental analysis

| | Analytical values | Theoretical values as $C_{17}H_{31}CONHCH\text{-}\underset{CH_2\text{-}\!\!\bigg\langle\bigg\rangle}{\overset{}{\underset{|}{}}}\!\!\!\!\!\!\!\!\underset{}{\overset{}{\bigg\langle}}\!\!\!\underset{S}{\overset{}{\bigg\rangle}}$ |
|---|---|---|
| C (percent) | 77.27 | 77.42 |
| H (percent) | 9.44 | 9.25 |
| N (percent) | 3.04 | 3.10 |
| S (percent) | 6.66 | 6.88 |

EXAMPLE 9

A mixture of 10 g of safflower oil and 17 g of α-(2-thienyl)-phenethylamine was heated in a nitrogen stream at 150° C for 85 hours. After cooling, 100 ml of ether was added thereto. The resultant reaction mixture was washed in a cooled state with dilute hydrochloric acid, water, an aqueous sodium carbonate solution and water, and dried over Glauber's salt, and then the solvent was distilled off. Subsequently, the resultant reaction product was purified by a cilica gel column chromatograph with a mixed solvent of petroleum ether and benzene, and the solvent was distilled off completely to give 21.5 g of a semi-solid.

Elemental analysis thereof showed 77.07 percent of carbon, 9.52 percent of hydrogen, 3.01 percent of nitrogen and 6.72 percent of sulfur, and infrared absorption spectrum showed an absorption of —NH— at 3260 cm$^{-1}$ and an absorption of —CON= at 1640 cm$^{-1}$. These results indicated that the semi-solid was the objective

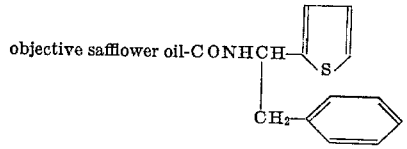

EXAMPLE 10

To a solution of 2.8 g of triethylamine and 3.4 g of α-(2-thienyl)-ethylamine in 100 ml of ether, 8 g of linoleoyl chloride was added dropwise at 15° to 20° C with stirring. The resultant mixture was stirred at room temperature for 4 hours, then allowed to stand for one night, and subsequently refluxed for 2 hours. After cooling, the resultant reaction mixture was washed with a cooled aqueous hydrochloric acid, water, an aqueous sodium carbonate solution and water, and dried over Glauber's salt. Thereafter, the solvent was distilled off therefrom. Finally, the solvent was distilled off completely at 80° C under reduced pressure of 0.1 mm Hg, to give 9.0 g (yield: 81 percent) of the objective linoleoyl-α-(2-thienyl)-ethylamide, $N_D^{24}$ 1.5067.

Elemental analysis

|   | Analytical values | Theoretical values as 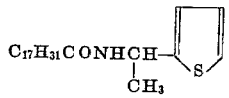 |
|---|---|---|
| C (percent) | 73.91 | 74.04 |
| H (percent) | 10.48 | 10.03 |
| N (percent) | 3.47 | 3.60 |
| S (percent) | 8.09 | 8.23 |

EXAMPLE 11

To a solution of 2.1 g of triethylamine and 4.0 g of α-(3-pyridyl)-benzylamine in 60 ml of ether, 7.1 g of linoleoyl chloride was added dropwise at 20° to 25° C for 1 hour with stirring. The resultant reaction mixture was treated by a manner similar to that in Example 1 and there was obtained 6.2 g (yield: 64 percent) of the objective linoleoyl-α-(3-pyridyl)-benzylamide, $N_D^{23}$ 1.5357.

Elemental analysis

|   | Analytical values | Theoretical values as 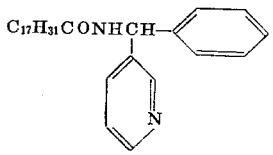 |
|---|---|---|
| C (percent) | 80.48 | 80.67 |
| H (percent) | 9.70 | 9.48 |
| N (percent) | 6.19 | 6.27 |

EXAMPLE 12

To a mixture of 1.5 g of triethylamine and 3.0 g of α-(4-pyridyl)-benzylamine in 50 ml of ether, 5.4 g of linoleoyl chloride was added dropwise at 20° to 25° C for 40 minutes with stirring. The resultant reaction mixture was treated by a manner similar to that in Example 1 and there was obtained 5.0 g (yield: 69 percent) of the objective linoleoyl-α-(4-pyridyl)benzylamide, $N_D^{23}$ 1.5323.

Elemental analysis

|   | Analytical values | Theoretical values as 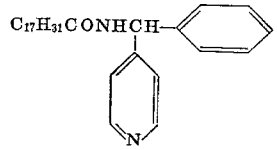 |
|---|---|---|
| C (percent) | 80.49 | 80.67 |
| H (percent) | 9.25 | 9.48 |
| N (percent) | 6.10 | 6.27 |

We claim:
1. A fatty acid amide represented by the formula,

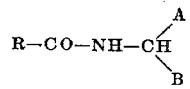

wherein R represents a saturated or olefinically unsaturated straight or branched aliphatic hydrocarbon group having 15 to 25 carbon atoms which may bear a hydroxyl group, A represents a lower alkyl, phenyl or phenyl lower alkyl, and B represents thienyl.

2. Linoleoyl-α-(2-thienyl)-ethyl amide.

3. A fatty acid amide according to claim 1, wherein the alkyl group of the symbol A is methyl.

4. A fatty acid amide according to claim 1, wherein the phenyl lower alkyl of the symbol A is benzyl.

5. A fatty acid amide according to claim 1, wherein the amine moiety is α-(2-thienyl)ethylamine or α-(2-thienyl)phenethylamine.

6. Isostearoyl-α-(2-thienyl)-ethyl amide.

7. Linoleoyl-α-(2-thienyl)-ethyl amide.

8. Linoleoyl-α-(2-thienyl)-phenethyl amide.

* * * * *